United States Patent
Albers et al.

(10) Patent No.: US 10,017,023 B2
(45) Date of Patent: Jul. 10, 2018

(54) METHOD FOR CONTROLLING THE LEVEL OF AN AIR-SUSPENDED MOTOR VEHICLE

(71) Applicant: WABCO GmbH, Hannover (DE)

(72) Inventors: Juergen Albers, Nienburg (DE);
Siegfried Bartel, Barsinghausen (DE);
Reinhard Gocz, Seelze (DE); Ingo Jovers, Gehrden (DE); Uwe Lentz, Neustadt (DE)

(73) Assignee: WABCO GmbH, Hannover (DE)

( * ) Notice: Subject to any disclaimer, the term of this patent is extended or adjusted under 35 U.S.C. 154(b) by 74 days.

(21) Appl. No.: 15/312,212

(22) PCT Filed: May 22, 2014

(86) PCT No.: PCT/EP2014/001377
§ 371 (c)(1),
(2) Date: Nov. 18, 2016

(87) PCT Pub. No.: WO2015/176731
PCT Pub. Date: Nov. 26, 2015

(65) Prior Publication Data
US 2017/0120711 A1 May 4, 2017

(51) Int. Cl.
*B60G 17/017* (2006.01)
*B60G 17/015* (2006.01)
*B60G 17/052* (2006.01)

(52) U.S. Cl.
CPC ....... *B60G 17/0155* (2013.01); *B60G 17/017* (2013.01); *B60G 17/052* (2013.01);
(Continued)

(58) Field of Classification Search
CPC .................. B60G 17/017; B60G 2800/202
See application file for complete search history.

(56) References Cited

U.S. PATENT DOCUMENTS

| | | |
|---|---|---|
| 4,948,166 A | 8/1990 | Kaneko |
| 5,083,275 A | 1/1992 | Kawagoe et al. |

(Continued)

FOREIGN PATENT DOCUMENTS

| | | |
|---|---|---|
| DE | 4042490 C2 | 6/1995 |
| DE | 19524730 A1 | 1/1997 |

(Continued)

*Primary Examiner* — Todd Melton
(74) *Attorney, Agent, or Firm* — Leydig, Voit & Mayer, Ltd.

(57) ABSTRACT

A method for controlling the level of an air-suspended motor vehicle includes determining, by a sensor system, at least one of the speed of travel or the actuation state of a parking brake, measuring, if at least one of the speed of travel has undershot a minimum speed of travel or the parking brake has been actuated, the actual level in the region of each air spring bellows, comparing the measured values for the actual level with the predetermined setpoint level, determining an actual level value of an air spring bellows having the greatest deviation from the setpoint level, and expanding, for the air spring bellows having an actual level having the greatest deviation from the setpoint level, the tolerance band by at least one of increasing the upper tolerance limit thereof to a corrected upper tolerance limit or lowering the lower tolerance limit thereof to a corrected lower tolerance limit.

15 Claims, 3 Drawing Sheets

(52) U.S. Cl.
CPC .... *B60G 2202/152* (2013.01); *B60G 2300/14* (2013.01); *B60G 2400/204* (2013.01); *B60G 2400/952* (2013.01); *B60G 2800/202* (2013.01)

(56) References Cited

U.S. PATENT DOCUMENTS

| | | | |
|---|---|---|---|
| 6,061,615 A | 5/2000 | Karthaeuser | |
| 6,234,493 B1 | 5/2001 | Kleen et al. | |
| 7,104,547 B2 * | 9/2006 | Brookes | B60G 17/0155 280/5.507 |

FOREIGN PATENT DOCUMENTS

| | | |
|---|---|---|
| DE | 19539887 B4 | 4/1997 |
| DE | 19821305 A1 | 11/1999 |
| DE | 102012006468 A1 | 10/2013 |
| EP | 0779166 B1 | 8/2001 |
| EP | 1925471 B1 | 4/2010 |

* cited by examiner

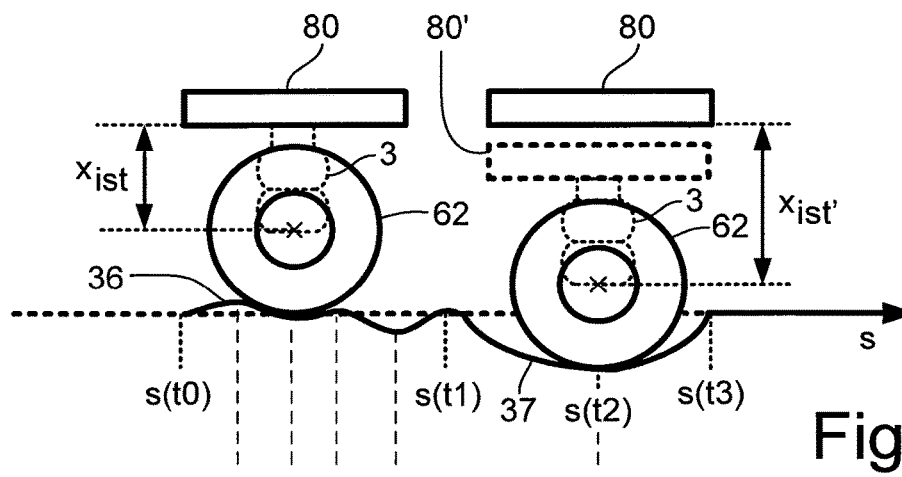
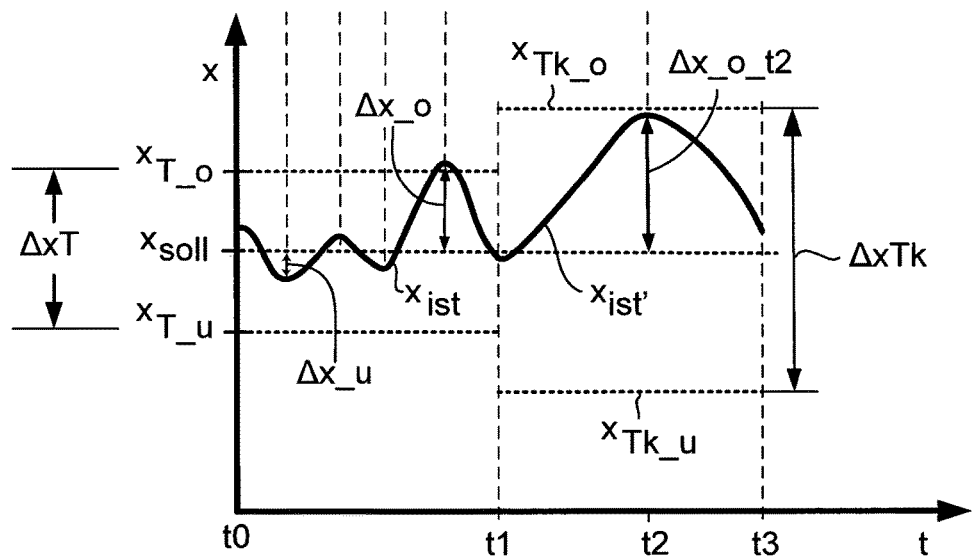
Fig.1
Fig.2

METHOD FOR CONTROLLING THE LEVEL OF AN AIR-SUSPENDED MOTOR VEHICLE

CROSS REFERENCE TO RELATED APPLICATIONS

This application is a U.S. National Stage application under 35 U.S.C. § 371 of International Application No. PCT/EP2014/001377 filed on May 22, 2014. The International application was published in German on Nov. 26, 2015 as WO 2015/176731 A1 under PCT Article 21(2).

FIELD

The invention relates to a method for controlling the level of an air-suspended motor vehicle, e.g. a bus, which has an air-suspended front axle and at least one air-suspended rear axle, and in which, by means of level control valves designed as switching valves, a plurality of air spring bellows arranged between running gear elements of the vehicle axles and the vehicle body are each supplied with air whenever a lower tolerance limit of a tolerance band is undershot, and relieved of air whenever an upper tolerance limit of the tolerance band is exceeded, in order to adjust a predetermined setpoint level.

BACKGROUND

Air suspension systems have significant advantages over conventional steel suspension systems and are therefore increasingly being used both on commercial vehicles, such as heavy goods vehicles and buses, and on, preferably heavy, passenger vehicles, such as luxury cars and off-road vehicles. Thus, an air suspension system allows level control independent of loading since the current state of loading can be compensated in each case by adapting the bellows pressure in the air spring bellows. By virtue of the progressive spring characteristics of the air springs, an air suspension system likewise offers particularly reliable contact between the wheels and the roadway and comfortable response behavior during wheel compression and rebound. Another advantage of air suspension systems is that the ground clearance of the vehicles concerned can be modified when required, e.g. can be increased for off-road use and reduced for high-speed driving on freeways. In the case of commercial vehicles, there is the additional fact that the vehicle body can be lowered or adjusted to a suitable level for loading and unloading. Thus, for example, the vehicle chassis of an air-suspended heavy goods vehicle or trailer can be lowered to set down an interchangeable flatbed and raised again to pick it up. It is likewise possible for the load surface of a heavy goods vehicle to be adjusted to the level of a loading ramp to facilitate loading and unloading by lowering or raising the bellows pressure at the rear axle. In the case of air-suspended buses, the vehicle body can be lowered on one side by releasing the compressed air from the spring bellows on the outside of the roadway to make it easier for passengers to get in and out, and can then be raised again by filling the spring bellows. This function is also known as kneeling or easy entry.

To control the level of a corresponding motor vehicle by means of displacement sensors, which are arranged on both sides, in each case between the vehicle axles or suspension elements of the vehicle axles and the vehicle body, the respective actual level of the vehicle body in relation to the vehicle axle is detected and compared in a control unit with the predetermined setpoint level stored there. If the respective level control valves associated with each of the air spring bellows arranged on both sides on the vehicle axles, are, as envisaged in the present case, designed as switching valves, to be more precise as 2/2-way switching valves, level control is performed, as is known, by connecting the relevant air spring bellows to a pressurized main line by opening the associated level control valve if a lower setpoint level tolerance limit is undershot, and thereby supplying it with air, and connecting said bellows to the main line by opening the associated level control valve, said main line then being unpressurized, if an upper setpoint level tolerance limit is exceeded, and thereby releasing air from it. To ensure that the main line is pressurized or unpressurized, as required at any particular time, it is in each case connected before this, e.g. via a main switching valve designed as a 3/2-way switching valve, to a compressed air source, e.g. a pressure accumulator or the pressure line of a compressor, or to a compressed air sink, e.g. an unpressurized line connected via a muffler to the environment. Allowing for the two setpoint level tolerance limits avoids a situation where the air spring bellows are alternately supplied with air or relieved of air at the slightest deviation between the respective actual level and the predetermined setpoint level, which would reduce the comfort of the vehicle passengers and would furthermore be associated with increased compressed air consumption. The structure of a corresponding air suspension system and the operation of a level control system of this kind is described in EP 0 779 166 B1, for example.

Said tolerance limits for a permitted deviation of the actual level from the setpoint level are usually defined specifically for the vehicle and represent a compromise between safe driving and high driving comfort. However, it is also possible to modify these tolerance limits in a suitable manner if certain operating states arise. Thus, in DE 195 39 887 B4, for example, there is a description of a method for controlling the level of an air-suspended motor vehicle, in particular a heavy goods vehicle, in which either a time delay in the level control is activated or the control dead band of the level control is extended by raising the upper tolerance limit and lowering the lower tolerance limit if the motor vehicle cannot be moved. By temporarily switching off level control, this is intended to prevent correction of brief deviations in the actual level from the setpoint level at one vehicle axle during a loading operation, caused, for example, by a relatively heavy forklift truck driving onto and off the load surface. The relevant operating state of the motor vehicle can be identified from the fact that the engine is switched off.

EP 0 779 166 B1 discloses a method for controlling the level of an air-suspended motor vehicle, in which, if the vehicle body assumes a tilted position at one vehicle axle, the correction of the tilted position may be broken off. Correcting the tilted position requires supplying air to the air spring(s) on the side on which the vehicle body has been lowered and releasing air from the air spring(s) on the side on which the vehicle body has been raised. Since this is accomplished by alternately switching over the connection of the main line to the compressed air source and the compressed air sink, provision is made for the number of opposite control cycles to be detected and evaluated. If a predetermined number of opposite control cycles is exceeded, the setpoint levels of the relevant vehicle axle(s) are set to match the current actual level by correspondingly shifting the respective upper and lower tolerance limits. This is intended to avoid exceeding a maximum pressure difference in the air springs of a vehicle axle and undershooting a minimum pressure in one of the air springs without using pressure sensors.

EP 1 925 471 B1 furthermore describes a method for controlling the level of an air-suspended motor vehicle in which, while driving, the transverse acceleration of the motor vehicle is detected and the setpoint level tolerance limits for the air springs on the inside of a bend and on the outside of a bend are modified differently in accordance with the transverse acceleration. Thus, according to this method, it is envisaged that the upper tolerance limit of the air spring bellows on the inside of a bend is raised further than that of the air spring bellows on the outside of a bend as the transverse acceleration increases, and that the lower tolerance limit of the air spring bellows on the outside of a bend is lowered further than that of the air spring bellows on the inside of a bend as the transverse acceleration increases. Owing to the asymmetric shifting of the tolerance limits for the air springs on a vehicle axle, tilting of the vehicle body is counteracted and opposing control processes are avoided.

During the operation of a vehicle, it may happen that it comes to a halt at a point where the front right-hand wheel is in a pothole or some other depression in the road surface, for example, while all the other vehicle wheels are standing on a level surface. In this situation, the displacement sensor at the front right-hand wheel supplies a control unit of the level control system with a distance value or actual level which is greater than distance values or actual levels at the other vehicle wheels and exceeds a tolerance limit. When operating in a conventional mode, the control unit can draw the conclusion from this that the front right-hand wheel is in a pothole or the like, with the result that the control unit decides to correct this state on the basis of a control program stored therein. For this purpose, compressed air is passed into air spring bellows and possibly released from other air spring bellows according to a selected strategy. The system then measures whether the actual level values of the individual wheel positions are once again within the limits of a tolerance band around a setpoint level value, i.e. have approached the setpoint level in a predetermined way. If the result of this control operation is worse, air is released from the air spring bellows of the vehicle, or they are filled with additional compressed air, in some other way on the basis of the new distance or actual level values obtained by the displacement sensors at the different wheel positions. This control process can take an inconveniently long time and can require a relatively large number of switching valve actuations in the level control system, thereby using up the entire service life of such switching valves over a relatively short time overall.

SUMMARY

In an embodiment, the present invention provides a method for controlling the level of an air-suspended motor vehicle, the air-suspended motor vehicle having an air-suspended front axle and at least one air-suspended rear axle, wherein level control valves designed as switching valves are configured to supply a plurality of air spring bellows with air whenever a lower tolerance limit ($x_{T\_u}$) of a tolerance band ($\Delta xT$) is undershot and to relieve the plurality of air spring bellows of air whenever an upper tolerance limit ($x_{T\_o}$) of the tolerance band ($\Delta xT$) is exceeded in order to adjust the actual level ($x_{ist}$) of the air spring bellows to a predetermined setpoint level ($x_{soll}$), wherein the air spring bellows are arranged between running gear elements of the vehicle axles and the vehicle body, and wherein, when a particular operational state is present, at least one of the upper tolerance limit ($x_{T\_u}$) and the lower tolerance limit ($x_{T\_o}$) is modified in a suitable manner for at least one air spring bellows of at least one vehicle axle or of at least one vehicle side. The method includes determining, by a sensor system, at least one of the speed of travel or the actuation state of a parking brake, measuring, if at least one of the speed of travel has undershot a minimum speed of travel or the parking brake has been actuated, the actual level ($x_{ist}$) in the region of each air spring bellows, comparing the measured values for the actual level ($x_{ist}$) with the predetermined setpoint level ($x_{soll}$), determining an actual level value ($x_{ist}$) of an air spring bellows having the greatest deviation ($\Delta_{x\_o\_r2}$) from the setpoint level ($x_{soll}$), and expanding, for the air spring bellows having an actual level ($x_{ist}$) having the greatest deviation ($\Delta_{x\_o\_r2}$) from the setpoint level ($x_{soll}$), the tolerance band ($\Delta xT$) by at least one of increasing the upper tolerance limit ($x_{T\_o}$) thereof to a corrected upper tolerance limit ($x_{Tk\_o}$) or lowering the lower tolerance limit ($x_{Tk\_u}$) thereof to a corrected lower tolerance limit ($x_{Tk\_u}$).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows schematically a vehicle body and a vehicle wheel according to an embodiment of the invention, which are in different positions on the road surface;

FIG. 2 shows, according to an embodiment of the invention, a diagram which illustrates the variation of the actual level of the vehicle wheel or vehicle body shown in FIG. 1 as the route is traveled;

DETAILED DESCRIPTION

Figure 3:
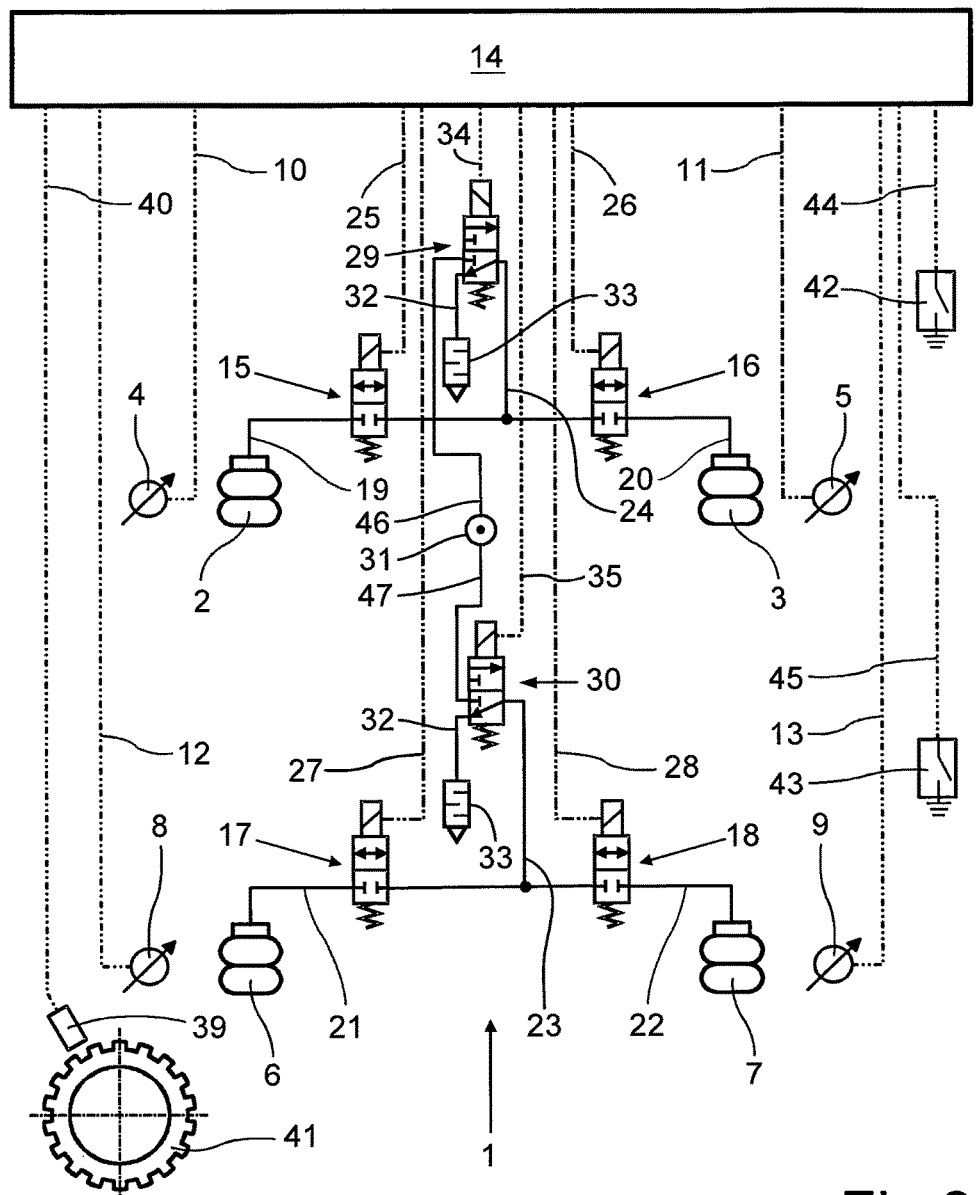
FIG. 3 shows the schematic structure of a control device for the air suspension system of a motor vehicle for the application of the method according to an embodiment of the invention.

In the level control method described in DE 10 2012 006 468 A1 (which is not a prior publication), which is intended to avoid fluctuations in height at the steps of the entry doors as passengers get on and off, it is envisaged that the speed of travel and/or the actuation state of a parking brake and the closed state of the entry doors are first of all detected by means of a sensor system, and that at least one of two setpoint level tolerance limits of the air spring bellows arranged on at least one vehicle axle or on one vehicle side is modified when the speed of travel has fallen below a minimum speed of travel and/or the parking brake has been actuated and if at least one of the entry doors has been opened, said modification being effected by lowering the upper tolerance limit to a corrected upper tolerance limit lying between the setpoint level and the previous upper tolerance limit and/or by raising the lower tolerance limit to a corrected lower tolerance limit lying between the setpoint level and the previous lower tolerance limit.

The present invention provides, in an embodiment, a method for controlling the level of an air-suspended motor vehicle of the type stated at the outset, e.g. of a bus, by which the control behavior thereof is improved. Thus, the intention is to reduce the control duration at least in those operating situations in which at least one vehicle wheel is in a depression in the road surface or on a raised part of the road surface.

Accordingly, the present invention provides, in an embodiment, a method for controlling the level of an air-suspended motor vehicle, e.g. a bus, which has an air-suspended front axle and at least one air-suspended rear axle, and in which, by means of level control valves, designed as switching valves, a plurality of air spring bellows arranged between running gear elements of the vehicle axles and the vehicle body are each supplied with air whenever a lower tolerance limit $x_{T\_u}$ of a tolerance band $\Delta xT$ is undershot, and relieved of air whenever an upper tolerance limit $x_{T\_o}$ of the tolerance band $\Delta xT$ is exceeded, in order to adjust the actual level $x_{ist}$ of said bellows to a predetermined setpoint level $x_{soll}$, wherein, when a particular operational state is present, at least one of the two tolerance limits $x_{T\_u}$, $x_{T\_o}$ is modified in a suitable manner for at least one air spring bellows of at least one vehicle axle or one vehicle side.

To reduce the control duration, at least in operating situations in which at least one vehicle wheel is in a depression in the road surface or on a raised part of the road surface, it is envisaged that the speed of travel and/or the actuation state of a parking brake are determined by a sensor system, in that, if the speed of travel has undershot a minimum speed of travel, which can be interpreted as a vehicle standstill, and/or if the parking brake has been actuated, the actual level is measured in the region of each air spring bellows, that the measured values for the actual level are compared with the predetermined value for the setpoint level, that the actual level value of an air spring bellows that displays the greatest deviation from the setpoint level is determined, and that, for the air spring bellows for which the greatest deviation between the actual level and setpoint level has been ascertained, the upper setpoint tolerance limit is increased to a corrected upper tolerance limit and/or the lower setpoint tolerance limit is lowered to a corrected lower tolerance limit.

Thus, the width of the tolerance band is increased by the setpoint level which is given by the distance between the lower setpoint level tolerance limit and the upper setpoint level tolerance limit and within which a deviation of the actual level from the setpoint level is not corrected by the control system. As a result, even relatively large deviations of the actual level from the setpoint level in comparison with normal driving are not changed by the level control system.

The relevant operating state is detected from the fact that the speed of travel has fallen below a minimum speed of travel, which can be interpreted as a vehicle standstill, and/or the parking brake has been actuated. The corresponding change in the tolerance limits of the relevant air spring bellows can be achieved in a simple manner by temporarily replacing the corresponding values for normal driving with new values within the electronic control unit of the air suspension system.

The control method proposed brings about, as it were, calming of the control behavior in a level control system since, owing to the fact that the original upper setpoint level tolerance limit is increased and/or the original lower setpoint level tolerance limit is lowered, control activity is avoided in those cases in which only one vehicle wheel is in a depression in the road surface or on a raised part of the road surface when the vehicle is at a standstill. The fact that the level control system remains, so to speak, inactive in terms of control in such a situation does not cause any disadvantages because, when one wheel is in a depression in the road surface for example, the remaining, at least three, vehicle wheels ensure that the vehicle is in a relatively stable position, which is generally also on a level largely parallel to the roadway. Admittedly, the wheel which is in the depression in the road surface is then subject to a lower load, and the other wheels are then subject proportionally to a higher load, but this is not regarded as disadvantageous. In an operating situation in which one vehicle wheel is on a raised part of the road surface, there are at least two other vehicle wheels which ensure a stable level of the vehicle body, comparatively parallel to the road surface. In this case, at least a fourth vehicle wheel, which is arranged on the same side of the vehicle as the vehicle wheel on the raised part of the road surface, is subject to a lower load, and the at least three loadbearing vehicle wheels are subject proportionally to a higher load. This is not regarded as disadvantageous either. In each of the operating situations described, the vehicle body is at least stable in terms of tilting and is aligned largely parallel to the roadway.

Using a method according to an embodiment of the invention makes it possible, in a level control system, to dispense with a switchable restrictor, which forms a switchable connection of small cross section for compressed air between the air spring bellows of the front right-hand wheel and the air spring bellows of the front left-hand wheel in conventional level control systems, thereby saving on installation space and production costs. A restrictor of this kind is also used in conventional level control systems to allow compressed air exchange between the air spring bellows of the front axle in the operating situations described, in which one front wheel is in a depression in the road surface or on a raised part of the road surface.

According to a first development of a method according to an embodiment of the invention, it is envisaged that, in the case of the air spring bellows in which an upper tolerance limit and/or a lower tolerance limit has been modified to an upper and/or lower corrected tolerance limit, the actual level is adjusted, if this corrected upper or lower tolerance limit is exceeded, back to a value which is within the corrected, and therefore extended, tolerance band for this air spring bellows but, in particular, outside the uncorrected tolerance band.

This ensures that level control takes place at the relevant air spring bellows only if the corrected tolerance limits of the extended tolerance band are exceeded or undershot, wherein the readjustment brings the actual level back into a range which is within the limits of the corrected tolerance band. As a result, the actual level at this air spring bellows does, admittedly, initially deviate relatively far from the setpoint level, but the level control system is calmed in respect of its calculation, feedback and/or feedforward activity.

According to a second variant, provision can be made, in the case of the air spring bellows in which an upper tolerance limit and/or a lower tolerance limit has been modified to an upper and/or lower corrected tolerance limit, the actual level is adjusted, if this corrected upper and/or lower tolerance limit is exceeded, back to a value which is within the uncorrected tolerance band for this air spring bellows.

This ensures that level control takes place at the relevant air spring bellows if the corrected tolerance limits of the extended tolerance band are exceeded or undershot, wherein the readjustment brings the actual level back into a range which is within the limits of the uncorrected tolerance band, thus allowing a method sequence according to an embodiment of the invention to begin again from a new starting position.

If a method according to an embodiment of the invention is used in a bus having at least one vehicle door, it is possible to envisage that, when the vehicle door is open, it is not the air spring bellows which is close to this vehicle door which is assigned corrected tolerance limits, even though the actual level value ascertained at this bellows is outside the limits of the uncorrected tolerance band, but the air spring bellows which is arranged on the same vehicle axle on the opposite vehicle side.

Although the vehicle wheel close to the door is in a depression in the road surface in such an operating situation, precise setting of the level at the air spring bellows associated with this vehicle wheel is preferred since people enter or leave the bus through the adjacent vehicle door. The relatively imprecise setting of the air spring bellows should then be available on the opposite vehicle side on the same vehicle axle.

In the case of a bus having at least one vehicle door, the method can furthermore be carried out in such a way that, when the vehicle door is open, it is not the air spring bellows which is close to this vehicle door which is assigned corrected tolerance limits, even though the actual level value ascertained at this bellows is outside the limits of the uncorrected tolerance band, but the air spring bellows which is arranged on the other vehicle axle on the opposite vehicle side, i.e. diagonally opposite. As a result, precise level control within the uncorrected tolerance limits is carried out at the air spring bellows in the region of the vehicle door, but a larger deviation of the actual level from the setpoint level is accepted at the diagonally opposite air spring bellows, i.e. at the rear of the vehicle and away from the entry door.

According to another variant, it is possible to envisage that, when the vehicle door is open, it is not the air spring bellows which is close to this vehicle door which is assigned corrected tolerance limits, even though the actual level value ascertained at this bellows is outside the limits of the uncorrected tolerance band, but all the air spring bellows which are arranged on the opposite vehicle side. By this means too, precise level control within the uncorrected tolerance limits is carried out at the air spring bellows in the region of the vehicle door, while a larger deviation of the actual level from the setpoint level is accepted at all the other air spring bellows.

Another embodiment of the method envisages that the relevant upper and/or lower corrected tolerance limits for the air spring bellows arranged close to the vehicle door are reset to the upper and/or lower uncorrected tolerance limits. Such resetting of the tolerance limits to the limits of an uncorrected and therefore narrower tolerance band is performed at the latest when it is detected that the vehicle has exceeded a certain low speed of travel.

In particular, it is preferred that resetting to the upper and/or lower uncorrected tolerance limits for the air spring bellows arranged close to the vehicle door is performed before control of the vehicle level takes place.

Because, as experience has shown, the fluctuations in the level of the step that may be perceived as troublesome by the passengers only occur when getting on and off via the front entry door, it is possible for the relevant tolerance limits of the air spring bellows arranged at the front axle to be modified according to an embodiment of the invention only when the front entry door is also actually open.

Moreover, it is possible to envisage that an air spring bellows, the actual level of which exceeds the upper or lower uncorrected tolerance limit, is assigned the same upper and/or lower corrected tolerance limits as every other one of the air spring bellows of the vehicle if the upper or lower uncorrected tolerance limits on one of these other air spring bellows are exceeded.

As an alternative to this, it is possible to envisage that an air spring bellows, the actual level of which exceeds the upper or lower uncorrected tolerance limit is assigned different upper and/or lower corrected tolerance limits than one or all of the other air spring bellows of the vehicle if the upper or lower uncorrected tolerance limits on one of these air spring bellows is exceeded. It is thereby possible to take very good account of special vehicle-specific features.

Likewise as an alternative thereto, it is possible to envisage that the upper and the lower uncorrected tolerance limit on an air spring bellows, from the exceeding of which this air spring bellows is assigned corrected upper and/or lower tolerance limits, is the same for all the air spring bellows. This variant involves equal treatment of all the air spring bellows or wheel positions of the vehicle.

It is furthermore possible to envisage that the upper and the lower uncorrected tolerance limit on an air spring bellows, from the exceeding of which this air spring bellows is assigned corrected upper and/or lower tolerance limits, are different for all or some of the air spring bellows. By means of this measure, it is possible to take particularly good account of vehicle-specific peculiarities.

Finally, it is possible to envisage that the value of the positive or negative deviation of the actual level from the setpoint level, from which the associated air spring bellows is assigned a corrected upper and/or lower tolerance limit, is still within the value range of the uncorrected tolerance limits. This procedure means that the tolerance band is already extended in a control unit in respect of a deviation of the actual level from the setpoint level which is inoperative for control purposes, if the current deviation of the actual level from the setpoint level is still within the permitted limits of the uncorrected tolerance band. The, as it were precautionary, trigger for such an extension of the tolerance band can be the detection of an imminent halt of a bus at a stop, for example.

Figure 4:
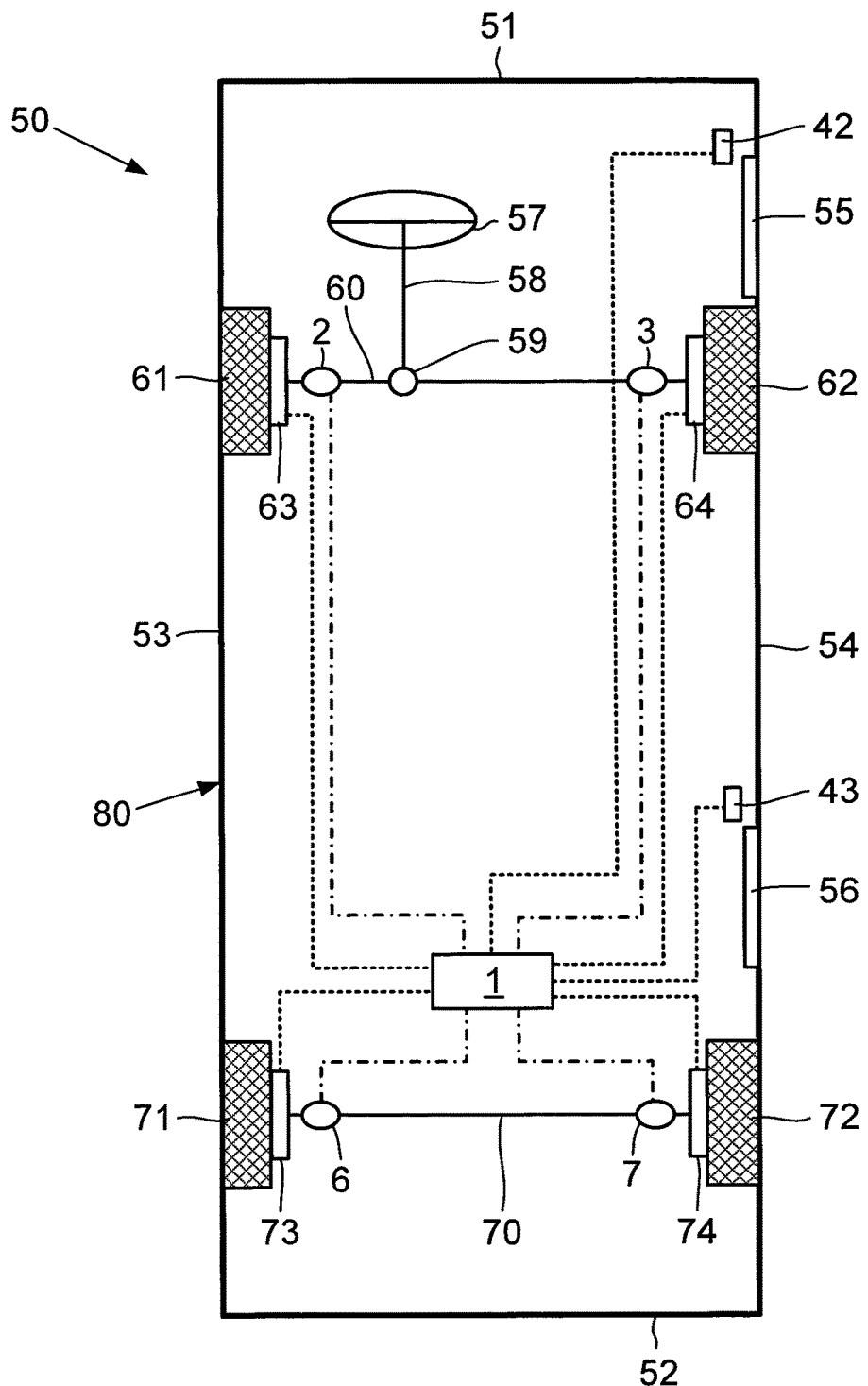
FIG. 4 shows a schematic illustration of a bus having two vehicle axles and two entry doors according to an embodiment of the invention.

For better orientation, a description is first of all given of a motor vehicle illustrated in FIG. 4, namely a bus 50, on which is arranged a control device 1, with the aid of which a method according to an embodiment of the invention can be carried out. The bus 50 has a vehicle body 80 with a front side 51 facing in the direction of forward travel, a rear side 52 facing in the direction of rearward travel, a vehicle side 53 on the inside of the roadway and a vehicle side 54 on the outside of the roadway. Arranged in the region of the front side 51 of the bus 50 is a steering wheel 57, by means of which the wheels 61, 62 on the front axle 60 can be steered by a driver via a steering shaft 58 and a steering gear 59.

The vehicle body 80 is supported by a front axle 60 and a rear axle 70 of the bus 50. A front left-hand wheel 61 and a front right-hand wheel 62 are arranged rotatably on the free ends of the front axle 60, while a rear left-hand wheel 71 and a rear right-hand wheel 72 are secured rotatably on the rear axle 70. Arranged on said vehicle wheels 61, 62, 71, 72 are front right-hand and left-hand and rear right-hand and left-hand wheel brakes 63, 64, 73, 74, which can be actuated as service brakes and as parking brakes. For this purpose, the wheel brakes 63, 64, 73, 74 have actuators, which are not shown but are known, which can be activated hydraulically, pneumatically or electrically by the control device 1 via control lines shown in dashed lines.

The vehicle body 80 is supported by the two vehicle axles 60, 70 via air spring bellows. For this purpose, a front left-hand air spring bellows 2 is arranged in the region of the front left-hand wheel 61, a front right-hand air spring bellows 3 is arranged in the region of the front right-hand wheel 62, a rear left-hand air spring bellows 6 is arranged in the region of the rear left-hand wheel 71, and a rear right-hand air spring bellows 7 is arranged in the region of the rear right-hand wheel 72. These air spring bellows 2, 3, 6, 7 are connected to the control device 1 via pneumatic control lines shown in dash-dotted lines, allowing air to be supplied to or released from them as required.

Finally, the overview of the bus 50 shows a front entry door 55 and a rear entry door 56, the actuation position of which, i.e. open or closed, can be determined by means of a first contact switch 42 associated with the front entry door 55 and by means of a second contact switch 43 associated with the rear entry door 56. The signals of the two contact switches 42, 43 are made available to the control device 1 via signal lines shown in dashed lines.

FIG. 3 shows, in more detailed form, the structure known per se of the control device 1 of the air suspension system of the bus 50, which device has already been mentioned several times and in which the method according to an embodiment of the invention for level control can be applied. Accordingly, a front left-hand air spring bellows 2 and a front right-hand air spring bellows 3 as well as respective displacement sensors 4, 5 are arranged at the front axle 60, close to the front left-hand wheel 61 and close to the front right-hand wheel 62 respectively, in each case between a running gear element and the vehicle body 80. Likewise, a rear left-hand air spring bellows 6 and a rear right-hand air spring bellows 7 as well as respective displacement sensors 8, 9 are arranged at the rear axle 70, close to the rear left-hand wheel 71 and close to the rear right-hand wheel 72 respectively, in each case between a running gear element and the vehicle body 80. By means of the air pressure and the compressed air quantity in the respective air spring bellows 2, 3, 6, 7, the vertical distance between the relevant running gear element and the vehicle body 80 and thus the ground clearance of the bus 50 at the relevant vehicle wheel can be adjusted. The vertical distances between the relevant running gear element and the vehicle body 80 can be detected by the respective displacement sensors 4, 5, 8, 9 and transmitted to an electronic control unit 14 via associated signal lines 10, 11, 12, 13.

For supplying and releasing air, each air spring bellows 2, 3, 6, 7 is assigned a level control valve 15, 16, 17, 18, by means of which a connecting line 19, 20, 21, 22 of the relevant air spring bellows 2, 3, 6, 7 can in each case be connected to an associated first main line 23 or a second main line 24, which lead to a first main switching valve 29 and a second main switching valve 30, respectively. The four level control valves 15, 16, 17, 18 are designed as 2/2-way solenoid switching valves, which are each closed in a first position (rest position) and open in a second position (actuation position). For actuation of the level control valves 15, 16, 17, 18, the electromagnets thereof are each connected to the control unit 14 via a control line 25, 26, 27, 28. To lower the vehicle body 80 on one side (kneeling function), either the two air spring bellows 2, 6 arranged on the vehicle side 53 on the inside of the roadway are connected by means of the associated level control valves 15, 17 and the two main lines 23, 24 to the two main switching valves 29, 30, or the air spring bellows 3, 7 arranged on the vehicle side 54 on the outside of the roadway are connected by means of the level control valves 16, 18 associated therewith and via the two main lines 23, 24 to the two main switching valves 29, 30. The lowering of the vehicle body 80 on one side is achieved when the two main switching valves 29, 30 are in the rest position shown in FIG. 3, allowing the compressed air to escape from the air spring bellows 2, 6 or the air spring bellows 3, 7 via a muffler 33 into the surrounding air.

Moreover, the two main lines 23, 24 can be connected alternately via the two main switching valves 29, 30 to a compressed air source 31 or a compressed air sink. The compressed air source 31, which is shown only symbolically in the present case, is preferably a with a compressor and/or a compressed air reservoir, which (31) is connected via a first pressure line 46 and a second pressure line 47, respectively, to the two main switching valves 29, 30. In the present case, the compressed air sink is formed by an unpressurized line 32 leading via the muffler 33 into the environment.

The two main switching valves 29, 30 are each designed as a 3/2-way solenoid switching valve, by means of which, as already mentioned, the respective main line 23, 24 is connected to the unpressurized line 32 in a first position (rest position) and to the compressed air source 31 in a second position (actuation position). For actuation of the two main switching valves 29, 30, the electromagnets thereof are each connected to the control unit 14 via a control line 34, 35 respectively.

Using a method according to an embodiment of the invention makes it possible to dispense with a switchable restrictor, which is generally present between the two said connecting lines 19, 20 of the air spring bellows 2, 3 arranged at the front axle 60, thereby saving on costs and installation space, since a compensating pneumatic fluid flow between the two air spring bellows 2, 3 of the front axle 60 is not necessary.

To detect the current speed of travel, a speed sensor 39 is provided, which is connected to the control unit 14 via a signal line 40 and is arranged on a transmitter wheel 41. The transmitter wheel 41 is arranged on a component of the bus 50, such as the hub of a vehicle wheel 61, 62, 71, 72 or the output shaft of the driving transmission, which rotates in proportion to the speed of travel in the driving mode. As an alternative, the speed of travel as determined in some other way, the opening status of at least one vehicle door 55, 56 and/or the actuation status of a brake, in particular of the parking brake of the vehicle 50, can also be made available via a CAN bus signal.

To record the closing state of the front and rear entry doors 55, 56, the front and rear contact switches 42, 43, each operatively connected to the relevant entry door 55, 56, are provided, said switches each being closed when the front or rear entry door 55, 56 is open and being connected to the control unit 14 via an associated first and second signal line 44, 45, respectively.

A method according to an embodiment of the invention is explained below in one embodiment with reference to FIGS. 1 and 2 by way of example for the wheel suspension of the front right-hand wheel 62 and the air spring bellows 3 associated with the latter.

FIG. 1 shows schematically the front right-hand wheel 62 when traveling over a road surface. This road surface extends over a section s and, as can be seen, has raised parts 36 of the road surface and depressions 37 in the road surface, which deviate upward and downward from a horizontal illustrated by dashes. The front wheel 62 rolls from left to right on this road surface and is therefore at associated points s(t) of the section at different times t. Above the front wheel 62, the figure shows a component of the vehicle body 80, which is connected to the front wheel 62 via the associated air spring bellows 3. The distance between the wheel axle and the component of the vehicle body 80 or the actual level is denoted by $x_{ist}$.

In the region of section s(t0) to s(t1) to be traveled, the bus 50 is in an operating situation in which the front wheel 62 thereof rolls on a relatively flat section of the road surface. In this section s(t0) to s(t1) of the section to be traveled, the value of the actual level $x_{ist}$, as FIG. 2 shows, is almost always within the tolerance band $\Delta xT$, which is bounded by an upper tolerance limit $x_{T\_o}$ and a lower tolerance limit $x_{T\_u}$, and it is therefore not necessary for the control unit 14 to intervene to control the level. By way of example, a slight negative deviation $\Delta x\_u$ of the actual level $x_{ist}$ from the setpoint level $x_{soll}$ is specially indicated. However, a positive deviation $\Delta x\_o$ of the actual level $x_{ist}$ from the setpoint level $x_{soll}$ can be seen just before time t1, said deviation being greater than the upper tolerance limit $x_{T\_o}$, whereupon the actual level $x_{ist}$ is brought back to a value within the tolerance band $\Delta xT$ by a conventional control action of the level control system even before time t1 is reached.

In a conventional control action, the front right-hand air spring bellows 3 is supplied with air as soon as the actual level $x_{ist}$ has undershot the lower tolerance limit $x_{T\_u}$, and relieved of air as soon as the actual level $x_{ist}$ has exceeded the upper tolerance limit $x_{T\_o}$. To supply air to the front right-hand air spring bellows 3, the second main line 24 is first of all connected to the compressed air source 31 by actuating the associated second main switching valve 30, and the connecting line 20 of the front right-hand air spring bellows 3 is then connected to the second main line 24, by actuating the level control valve 16 associated with the front right-hand air spring bellows 3, until the actual level $x_{ist}$ has largely reached the setpoint level $x_{soll}$. To release air from the front right-hand air spring bellows 3, the connecting line 20 of the front right-hand air spring bellows 3 is connected to the second main line 24 (which is positioned so as to be unpressurized in the state of rest), by actuating the level control valve 16 associated with the front right-hand air spring bellows 3, until the actual level $x_{ist}$ has largely reached the setpoint level $x_{soll}$. The two tolerance limits $x_{T\_u}$, $x_{T\_o}$ are chosen so that an optimum compromise between driving safety, driving comfort and compressed air consumption is obtained in the normal driving mode.

Subsequently, the bus 50 moves on, and the front wheel 62 runs into a relatively large depression 37 in the road surface in the region of section s(t1) to s(t2) to be traveled and stops there. If the bus 50 had only three wheels, namely two wheels on the front axle 60 and one wheel on the rear axle 70, the front right-hand wheel 62 would drive into the depression 37 in the road surface and would tilt the vehicle body 80' into the position shown in dashed lines. However, since the bus 50 has at least four wheels 61, 62, 71, 72, the vehicle body 80 thereof remains in a largely stable horizontal position.

At the lowest point s(t2) on the road surface, the actual level $x_{ist}'$ or the distance between the wheel axis and the vehicle body 80 has the level value $x_{ist}'$, which is larger than the previous distance or previous actual level $x_{ist}$. The displacement sensor 5 at the front right-hand wheel 62 detects this increased distance value $x_{ist}'$ and communicates this to the control unit 14. A conventionally operating level control system infers a tilted position of the vehicle body 80 from the increased distance value $x_{ist}'$ at the front right-hand wheel 62, and therefore it begins a control action to eliminate this tilted position if the deviation of the measured distance value $x_{ist}'$ deviates from a predetermined distance setpoint value or setpoint level $x_{soll}$ to an unreasonable extent. Permissible deviations of the measured actual level $x_{ist}'$ from the predetermined setpoint level $x_{soll}$, which do not trigger a control action by the control unit 14, lie within a tolerance band $\Delta xT$ which is bounded by a lower tolerance limit $x_{T\_u}$ and an upper tolerance limit $x_{T\_o}$.

At time t1, the front right-hand wheel 62 thus slowly enters the depression 37 in the road surface, in which the bus 50 comes to a standstill at time t2. As soon as the control unit 14 registers the vehicle standstill, it determines at which vehicle wheel 61, 62, 71, 72 the difference $\Delta x\_o\_t2$ of the actual level $x_{ist}'$ from the setpoint level $x_{soll}$ is greatest on the basis of the distance or level values measured by the respective displacement sensors 4, 5, 8, 9. If this maximum difference $\Delta x\_o\_t2$ between the actual level value $x_{ist}'$ and the setpoint level value $x_{soll}$ exceeds a tolerance limit $x_{T\_u}$, $x_{T\_o}$ of the tolerance band $\Delta xT$, the control unit 14 infers that the vehicle is tilted in this position of the vehicle wheel. As a response to this, the control unit 14 determines a corrected tolerance band $\Delta xTk$ for this position of the vehicle wheel, with corrected tolerance limits $x_{Tk\_u}$, $x_{Tk\_o}$, as a result of which the relatively large deviation $\Delta x\_o\_t2$ of the actual level value $x_{ist}'$ from the setpoint level value $x_{soll}$ is not eliminated by adjustment toward a lower difference value by the level control system.

Referring closely to FIGS. 1 and 2, this means that, when the vehicle is stationary at time t(2), the actual level $x_{ist}'$ of the air spring bellows 3 at the front right-hand wheel 62 has a value $\Delta x\_o\_t2$ which is significantly greater than the upper tolerance limit $x_{T\_o}$ of the uncorrected tolerance band $\Delta xT$. Whereas, in conventional level control systems, the control unit 14 would now start a control action in order to eliminate this incorrect positioning, a control action of this kind is suppressed by a method according to an embodiment of the invention. Suppression of a control action of this kind is triggered if, when the operating situation described is detected, i.e. when the vehicle is stationary and the actual level $x_{ist}'$ at one wheel position is beyond a tolerance limit $x_{T\_u}$, $x_{T\_o}$ of the tolerance band $\Delta xT$, these original tolerance limits $x_{T\_u}$, $x_{T\_o}$ are modified by predetermined amounts to corrected tolerance limits $x_{Tk\_u}$, $x_{Tk\_o}$ so as to extend the original tolerance band $\Delta xT$ toward a corrected tolerance band $\Delta xTk$.

As FIG. 2 shows, a corrected tolerance band $\Delta xTk$ thereby comes into effect at the air spring bellows 3 of the front right-hand wheel 62, within the corrected tolerance limits $x_{Tk\_u}$, $x_{Tk\_o}$ of which the actual level $x_{ist}'$ at time t2 is situated. A control action by the control unit 14 is therefore not triggered. Since the vehicle considered here is a bus 50 having at least four wheels 61, 62, 71, 72, the bus 50 nevertheless stands in a stable manner in a largely horizontal orientation, wherein only the front right-hand wheel 62 is somewhat relieved and the other vehicle wheels 61, 71, 72 are somewhat more heavily loaded as regards the wheel contact forces attributable to the road surface. The control activity of the control unit 14 and that of activatable control valves is thereby advantageously reduced.

Referring to FIG. 2, it can furthermore be envisaged that, in the case of the air spring bellows 3 at which the tolerance limits $x_{T\_u}$, $x_{T\_o}$ have been modified to corrected tolerance limits $x_{Tk\_u}$, $x_{Tk\_o}$, the actual level $x_{ist}$ is brought back by a control action of the control unit 14 to a value which is within the tolerance limits $x_{T\_u}$, $x_{T\_o}$ of the uncorrected tolerance band $\Delta xT$ of this air spring bellows 3 if said corrected tolerance limits $x_{Tk\_u}$, $x_{Tk\_o}$ are exceeded. Here, the adjustment is never exactly to the value of the setpoint level $x_{soll}$ but is to a value which is somewhat higher or somewhat lower than said setpoint level value $x_{soll}$.

It is also possible to envisage that, when the vehicle door 55 is opened, it is not the air spring bellows 3 which is close to this vehicle door 55 which is assigned corrected tolerance limits $x_{Tk\_u}$, $x_{Tk\_o}$, even though the actual level value $x_{ist}$, ascertained at this bellows is outside the tolerance limits $x_{T\_u}$, $x_{T\_o}$ of the uncorrected tolerance band $\Delta xT$, but the air spring bellows 2 which is arranged on the same vehicle axle 60 on the opposite vehicle side 53. This ensures that, when the side 54 of the bus 50 which is on the inside of the roadway is supposed to be lowered for easier entry and exit at a stop, the level control required for this purpose is possible with great precision by releasing air from the air spring bellows 3, 7 on the inside of the roadway. At the same time, however, level control at the opposite air spring bellows 2 on the same vehicle axle 60 is suppressed and control activity is thereby advantageously reduced.

According to another embodiment, it can be envisaged that the relevant tolerance limits $x_{T\_u}$, $x_{T\_o}$ for the air spring bellows 2, 3 arranged at the front axle 60 are only correspondingly modified to corrected tolerance limits $x_{Tk\_u}$, $x_{Tk\_o}$ if the front entry door 55 is also actually open. In this mode of operation, the control activity of the level control system is only reduced if the entry or exit of people from the bus is actually also to be expected.

As soon as the bus 50 in this illustrative embodiment starts off again and leaves the depression 37 in the road surface at time t3 at point s(t3) on the road surface, this is detected by the control unit 14 from the transmitted measured values from the speed sensor 39 and the displacement sensors 4, 5, 8, 9. As soon as this has occurred, the control unit 14 assigns all the air spring bellows 2, 3, 6, 7 the uncorrected limits $x_{T\_u}$, $x_{T\_o}$ of the uncorrected tolerance band $\Delta xT$, with the result that conventional level control then takes place in the driving mode.

By means of the proposed mode of operation of the control unit 14, the control activity of the level control system when the vehicle is stationary is greatly reduced, which extends the maximum usage life of the control valves concerned owing to the reduced frequency of actuation. Moreover, it is advantageous for the entering or leaving passenger when a bus is halted at a stop if no control activity of the level control system is audible and/or perceptible during this time. Furthermore, it is possible to dispense with the installation of a switchable restrictor between the two air spring bellows 2, 3 on opposite ends of the front axle 60 because, in the operating situation described, in which one front wheel 62 is in a relatively large depression 37 in the road surface or on a relatively high raised part 36 of the road surface, a transfer of compressed air from the air spring bellows 3 of one front wheel 62 to the air spring bellows 2 of the other front wheel 61 is no longer necessary.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 control device
2 air spring bellows
3 air spring bellows
4 displacement sensor at air spring bellows 2
5 displacement sensor at air spring bellows 3
6 air spring bellows
7 air spring bellows
8 displacement sensor at air spring bellows 6
9 displacement sensor at air spring bellows 7
10 signal line of displacement sensor 4
11 signal line of displacement sensor 5
12 signal line of displacement sensor 8
13 signal line of displacement sensor 9
14 control unit
15 level control valve of air spring bellows 2
16 level control valve of air spring bellows 3
17 level control valve of air spring bellows 6
18 level control valve of air spring bellows 7
19 connecting line of air spring bellows 2
20 connecting line of air spring bellows 3
21 connecting line of air spring bellows 6
22 connecting line of air spring bellows 7
23 first main line
24 second main line
25 control line of level control valve 15
26 control line of level control valve 16
27 control line of level control valve 17
28 control line of level control valve 18
29 first main switching valve
30 second main switching valve
31 compressed air source, pressure line
32 unpressurized line
33 muffler
34 control line of the first main switching valve 29
35 control line of the second main switching valve 30
36 raised part of road surface
37 depression in road surface
39 speed sensor
40 signal line from speed sensor 39
41 transmitter wheel
42 contact switch
43 contact switch
44 first signal line (from contact switch 42)
45 second signal line (from contact switch 43)
46 first pressure line
47 second pressure line
50 bus, motor vehicle
51 front side of the bus 52 rear side of the bus
53 side of the bus on the inside of the roadway
54 side of the bus on the outside of the roadway
55 front entry door
56 rear entry door
57 steering wheel
58 steering column
59 steering gear
60 front axle
61 front left-hand wheel
62 front right-hand wheel
63 wheel brake, parking brake, front left-hand side
64 wheel brake, parking brake, front right-hand side
70 rear axle
71 rear left-hand wheel
72 rear right-hand wheel
73 wheel brake, parking brake, rear left-hand side
74 wheel brake, parking brake, rear right-hand side
80, 80' vehicle body
x running gear level
$x_{ist}$, $x_{ist'}$ actual level
$x_{soll}$ setpoint level
$x_{T\_o}$ upper tolerance limit
$x_{T\_u}$ lower tolerance limit
$x_{Tk\_o}$ corrected upper tolerance limit
$x_{Tk\_u}$ corrected lower tolerance limit
$\Delta xT$ tolerance band, uncorrected
$\Delta xTk$ tolerance band, corrected
$\Delta x\_o\_t2$ deviation of the actual level from the setpoint level at time t2
s section of road surface
s(t0), s(t1) point on the road surface
s(t2), s(t3) point on the road surface
t time
t0, t1 times
t2, t3 times
$\Delta x\_u$ negative deviation from the setpoint level
$\Delta x\_o$ positive deviation from the setpoint level

The invention claimed is:

1. A method for controlling the level of an air-suspended motor vehicle having an air-suspended front axle and at least one air-suspended rear axle, wherein level control valves designed as switching valves are configured to supply a plurality of air spring bellows with air whenever a lower tolerance limit of a tolerance band is undershot and to relieve the plurality of air spring bellows of air whenever an upper tolerance limit of the tolerance band is exceeded in order to adjust the actual level of the air spring bellows to a predetermined setpoint level, wherein the air spring bellows are arranged between running gear elements of the vehicle axles and the vehicle body, and wherein, when a particular operational state is present, at least one of the upper tolerance limit and the lower tolerance limits is modified in a suitable manner for at least one air spring bellows of at least one vehicle axle or of at least one vehicle side, the method comprising:
determining, by a sensor system, at least one of the speed of travel or the actuation state of a parking brake;
measuring, if at least one of the speed of travel has undershot a minimum speed of travel or the parking brake has been actuated, the actual level in the region of each air spring bellows;
comparing the measured values for the actual level with the predetermined setpoint level;
determining an actual level value of an air spring bellows having the greatest deviation from the setpoint level; and
expanding, for the air spring bellows having an actual level having the greatest deviation from the setpoint level, the tolerance band to a corrected tolerance band by at least one of increasing the upper tolerance limit thereof to a corrected upper tolerance limit or lowering the lower tolerance limit thereof to a corrected lower tolerance limit.

2. The method as claimed in claim 1, further comprising for the air spring bellows for which the tolerance band has been expanded, adjusting, if corrected upper tolerance limit or the corrected lower tolerance limit is exceeded, the actual level to a value which is within the corrected tolerance band and outside the uncorrected tolerance band.

3. The method as claimed in claim 1, further comprising for the air spring bellows for which the tolerance band has been expanded, adjusting, if corrected upper tolerance limit or the corrected lower tolerance limit is exceeded, the actual level to a value which is within the uncorrected tolerance band.

4. The method as claimed in claim 1, wherein the method is used in operating a bus having at least one vehicle door.

5. The method as claimed in claim 4, wherein when the vehicle door is open, the tolerance band ($\Delta xT$) for an air spring bellows which is closest to the vehicle door is not assigned corrected tolerance limits even though its actual level value is outside the of the uncorrected tolerance band, but instead the tolerance band for an air spring bellows arranged on the same vehicle axle on the opposite vehicle side is assigned corrected tolerance limits.

6. The method as claimed in claim 5, wherein the relevant tolerance limits for the air spring bellows arranged at the front axle are only correspondingly modified if the front entry door of the motor vehicle is also actually open.

7. The method as claimed in claim 4, wherein when the vehicle door is open, the tolerance band for an air spring bellows which is closest to the vehicle door is not assigned corrected tolerance limits even though its actual level value is outside the limits of the uncorrected tolerance band, but instead the tolerance band for an air spring bellows arranged on the other vehicle axle on the opposite vehicle side, i.e. diagonally opposite, is assigned corrected tolerance limits.

8. The method as claimed in claim 4, wherein when the vehicle door is open, the tolerance band for an air spring bellows which is closest to the vehicle door is not assigned corrected tolerance limits even though its actual level value is outside the limits of the uncorrected tolerance band, but instead tolerance bands for all the air spring bellows which are arranged on the opposite vehicle side of the vehicle are assigned corrected tolerance limits.

9. The method as claimed in claim 4, wherein the relevant upper and/or lower corrected tolerance limits for the air spring bellows arranged closest to the vehicle door are reset to the upper and/or lower uncorrected tolerance limits.

10. The method as claimed in claim 9, resetting to the upper and/or lower uncorrected tolerance limits (x -for the air spring bellows arranged closest to the vehicle door is performed before control of the level takes place.

11. The method as claimed in claim 1, wherein an air spring bellows, the actual level of which exceeds the upper or lower uncorrected tolerance limit, is assigned the same upper and/or lower corrected tolerance limits as every other one of the air spring bellows of the vehicle if the upper and/or lower uncorrected tolerance limits on one of these other air spring bellows are exceeded.

12. The method as claimed in claim 1, wherein an air spring bellows, the actual level of which exceeds the upper or lower uncorrected tolerance limit, is assigned different upper and/or lower corrected tolerance limits than one or all of the other air spring bellows of the vehicle if the upper and/or lower uncorrected tolerance limits on one of these other air spring bellows are exceeded.

13. The method as claimed in claim 1, wherein the upper and the lower tolerance limit on an air spring bellows, from the exceeding of which this air spring bellows is assigned corrected upper and/or lower tolerance limits, is the same for all the air spring bellows.

14. The method as claimed in claim 1, wherein the upper and the lower uncorrected tolerance limit on an air spring bellows, from the exceeding of which this air spring bellows is assigned corrected upper and/or lower tolerance limits, is different for all or some of the air spring bellows.

15. The method as claimed in claim 1, wherein the value of the positive or negative deviation of the actual level from the setpoint level, from which the associated air spring bellows is assigned a corrected upper and/or lower tolerance limit, is within the value range of the uncorrected tolerance limits.

* * * * *